Patented Jan. 2, 1934

1,942,000

UNITED STATES PATENT OFFICE 1,942,000

ART OF CURING CONCRETE

Ira S. Reynolds, Kirkwood, Mo.

No Drawing. Application July 1, 1931
Serial No. 548,252

3 Claims. (Cl. 25—154)

In the modern mixture of substances put together to form cement concrete it is the cement that is the chemically active agent. In the presence of the required amount of moisture a cement paste is formed. The moist cement paste permits the chemical reaction between water and cement to take place. Such reaction is known as hydration.

As hydration takes place the paste gradually provides a bond of progressively increased strength between all of the particles of the inactive substances in the mixture. The inactive substances, usually sand, gravel or crushed stone, are commonly known as aggregates. The maximum strength of the bond is only obtained under conditions where there is sufficient moisture present to assure of the complete hydration of every particle of cement in the mixture.

The extent of time required to fully complete the hydration of the cement is not definitely known. The immediate effect of hydration is hardening or setting. The time necessary for this early effect is known as the critical or curing period.

In the practice of the art of making cement concrete it has been found necessary to add moisture (water) to the mixture of cement and aggregates, greatly in excess of that necessary, solely for the complete hydration of the cement. This additional moisture (water) is necessary to compensate for the moisture that is absorbed by the aggregates themselves. In general cement concrete construction and roadway construction in particular, it is found that a still greater amount of water than is necessary to sufficiently moisten the mixture is required to make the mixture workable.

After thorough mixing of cement, aggregates and water, the mass (for roadway construction) is placed as by pouring into suitable forms, and the plastic concrete mass is then tamped so as to expel air that became incorporated in the mass during the operation of mixing the same. It is impracticable, however, to remove all of the air by tamping, and accordingly, during the first portion of the curing period numberless air bubbles form on the surface of the wet or moist concrete mass.

As soon as the wet mixture has been placed in the forms it begins to shrink, due to the escape of the moisture, and this shrinkage is generally considered to continue as in two stages, the first while the mass is plastic, and the second during the later period of hardening, after the mixture has assumed a definite structural form.

Shrinkage during the first stage is quite rapid, the rate being influenced greatly by the humidity conditions and air currents and the extent of the area of the surface exposed to the atmosphere. In roadway construction, particularly, the relatively thin layer of concrete with large area exposed to atmospheric drying conditions, the opportunity is present for too rapid surface shrinkage during the first stage, sufficient, if not controlled or greatly retarded to cause cracking, or surface-checking, which are decidedly detrimental to the final strength of the concrete. Shrinkage during the second stage proceeds at a very slow rate, and is also due to loss of moisture. The volume change is small. If the conditions of shrinkage during the first stage have been properly controlled, the possibility of cracking or surface-checking during the second period has been practically removed.

Changes in temperature also cause changes in volume of the mass at any time. The volume of the mass increases or decreases as the temperature of the mass rises or falls. When the mass is in its early plastic condition, change of volume has no ill effect, but as the hydration proceeds, a resistance to change of volume is set up, causing stresses to develop, which, unless carefully controlled, will result in cracking and surface-checking. If the condition of temperature change has been properly controlled during the first stage of curing, the mass will have developed sufficient inherent strength to reduce the possibility of cracking or surface-checking subsequently.

It is therefore to be observed, that to prevent or to control the drying effect caused by the atmosphere or air currents in direct contact with the exposed surface of the fresh plastic mixture during the first stage of curing, is to effectually reduce the amount of surface shrinkage, thereby ensuring against loss of strength by prevention of cracking or surface-checking. Also to prevent excessive changes in temperature during the first curing stage tends to limit the extent of the changes in volume, due to temperature changes, thereby reducing the opportunity for cracking or surface-checking. Moreover, if the two factors mentioned above can be controlled in such a way as to allow the process of hydration to be completed in the presence of an excess amount of moisture, the resultant concrete will be of maximum strength.

In actual construction of cement concrete, particularly for roadway purposes, the common practice up to the present moment, with respect to the control of the process of hydration during the first stage of curing, has been to attempt to confine or hold the excess moisture of the mass at or below the exposed surface of the mass, as by repression beneath an adhesive film of water-impervious bitumen or other asphaltic compounds. Also by covering the exposed surface with wetted burlap, or canvas or straw or earth. Also by thinly covering the exposed surface with crystals of deliquescent chemical compounds presumed to liquefy by drawing moisture from the average humidity of the atmosphere, to form a thin liquid surface-film over the surface of the fresh wet mass.

The methods above referred to for treating the fresh plastic mass during the first stage of curing are open to many objections, and are not generally effective, as practiced, in confining or retaining the original moisture of the mass within the limits allowable for effective hydration during the first stage of curing. For example, if a so-called "seal coat" consisting of a film or coating of bitumen or other asphaltic compound is applied to the wet concrete mass, the bubbles of air which continue to escape from the concrete mass after the sealing film or coating has been applied, rupture said film and form numerous small orifices in same, and when the bituminous solids of the film solidify or harden, due to the evaporation of the volatile constituents of the sealing film, said orifices become permanent, with the result that the effectiveness of the film as a medium to seal the concrete mass from the atmosphere is materially diminished.

Due to their dark brown to black inherent colors, bitumen emulsions and asphaltic compounds employed as "seal coats" for concrete roadways, are further deficient, in that they absorb a substantially greater amount of heat from the rays of the sun than is the case when the surface of the mass, not so treated, is equally exposed. As previously described, changes in temperature cause changes in volume, with the consequent result that the volume of the mass is greatly expanded during exposure to the sun, and the volume contracts to a corresponding degree by reason of lower temperatures, particularly during the night. The alternating change in volume sets up internal stresses, within the hardening concrete mass, that are seriously detrimental to the ultimate strength of the concrete, and for the same reason these films cannot be effective agents to prevent cracking and surface-checking.

In the case of wetted coverings, it is not always possible to keep the coverings sufficiently wetted for the entire required time to prevent absorption of moisture from the mass by the covering agent itself, and further, due to the early plastic condition of the unset mass, the application of such coverings cannot be made until a substantial time after the mass has been poured, and it has become sufficiently set or hardened to acquire the amount of strength necessary to support the weight of the coverings without marring the finished surface. The use of wetted coverings is also open to the objection that it often permits sufficient elapsed time to allow an excessive change of volume to take place by reason of evaporation, thereby causing cracking and surface-checking.

I have discovered that it is beneficial to the ultimate strength of the concrete to allow the air content remaining in the mass after tamping to be dissipated most freely and also as quickly as conditions will permit, after the mixture has been tamped in the forms and the surface of the mass has been finished, the reason being manifest that the maximum shrinkage of volume, due to volume loss of air, takes place before the mass has an opportunity to set or harden sufficiently to offer any resistance to the change in volume. I have also discovered that when the atmosphere or air currents are not permitted to establish direct contact with the exposed surface of the moist unset mass, the moisture necessary for full or complete hydration will remain within the mass and the resultant concrete will be exceptionally strong. I have also discovered that to prevent the occurrence of vapor-pressure within the moist unset mass, tends to substantially reduce the cause of internal stresses, and therefore, has a correspondingly beneficial effect upon the final strength and resistance to wear, thus prolonging the useful life of the concrete.

As a result of my discoveries, I have devised a method for curing concrete which is a decided improvement on prior methods contemplating the use of a protective film or coating formed from a liquid substance that is applied to the wet concrete mass after it has been tamped, in that it is inexpensive and produces concrete of improved strength and wearing qualities.

Briefly described, my method consists in applying to the exposed surface of a moist or wet concrete mass or mixture immediately upon the conclusion of the operation of smoothing or finishing, or as soon as practicable after tamping, a water-repellent protective film or coating that will adhere to the concrete mass and which is of such a character or nature that it permits the escape of bubbles of air incorporated in or confined in the concrete mass without liability, however, of forming permanent openings or orifices in the protective film, thereby causing the film to remain in a practically impervious state or condition during the curing period, with the result that the concrete mass is effectively insulated from the atmosphere, and the evaporation of moisture from the concrete mass during the entire curing period is retarded or prevented. The protective film or coating contemplated by my method is distinguished from the seal coats or protective films heretofore used in the operation of curing concrete roadways, particularly in that it is of such a nature that the bubbles of air which continue to escape from the concrete mass during the curing period will puncture or break through the film, but immediately after the escape of such bubbles of air, the orifices in the film through which said air escaped will close up, and thus cause the film to resume its normal impervious state or condition. The protective film or coating contemplated by my process also has the desirable characteristic of being colorless; it is sufficiently viscous to adhere to the surface of a mass of damp or moist concrete, and as it is water-repellent, it cannot be absorbed into the concrete. In addition to effectively insulating the concrete mass from the atmosphere, it greatly retards the rate of evaporation of moisture from the concrete mass during the entire curing period.

It is immaterial, so far as my broad idea is concerned, what materials or substances are used to form the protective film or coating contemplated by my process, so long as the film is "self-sealing", or, in other words, is capable of being punctured by the bubbles of air that continue to escape from the concrete mass during the early curing period, and after the escape of such bubbles of air, will automatically resume its former or normal impervious condition. For want of a better expression, I will say that the protective film or coating remains in a sufficiently "semi-fluid" condition during the early curing period to insure the film uniting of itself after it has been ruptured by the passage through same of the bubbles of air that escape from the concrete mass during the early curing period.

Preferably, the protective film or coating contemplated by my process is formed from a suitable mineral oil, a resinous substance, either natural or synthetic, and a suitable plasticizer or plasticizers. It can be applied to the wet or moist concrete mass in any suitable or preferred manner, but I have found that for roadway construction it is preferable to use a pressure-operated atomizer to apply the liquid that forms the film. After the solution has been applied the volatile solvent in same is immediately dispersed, thereby leaving on the surface of the wet concrete mass a colorless semi-fluid coating that constitutes a practically impervious film which effectively insulates the concrete mass from the atmosphere, without, however, interfering with the escape from the concrete mass of air that remained in the mass after the completion of the tamping operation. After the termination of the critical curing period, the substances of which the protective film or coating is composed will crystallize and will be automatically removed from the concrete mass (in the case of a roadway) by the wear of traffic and the action of the weather on the roadway. The final appearance of the roadway will be as natural as though no curing agent had been applied. At temperatures above the freezing point of water and when cement concrete can be made successfully, the free water or moisture of the mass will tend to vaporize increasingly as the temperature of the mass rises. This phenomenon is particularly pronounced at the very beginning of the first stage of curing. If the vapor is confined by the use of a protective film that is solid or of such a nature that air cannot escape from the moist concrete mass during the curing period, vapor-pressure is created within the mass, which results in substantially decreased final strength of the concrete. In my method I prevent the occurrence of vapor-pressure in the wet mass by allowing such vapor as is generated by nature to pass through the protective film or coating in the form of minute bubbles greatly dispersed, while at the same time a completely continuous non-porous coating of insulation is maintained, successfully restraining the atmosphere or air currents in their natural attempt to make intimate contact with the moist surface of the concrete. After the protective film or coating has been applied to the concrete mass, no further attention is necessary, as the process of curing will proceed naturally, provided the insulation coating is not disturbed. At the usual stipulated time the traffic can proceed in ordinary volume and the insulation coating will gradually disappear without notice or objection.

In consequence of its particular characteristics, application of the viscous liquid by the pressure atomizer method may be made in such a manner as to result in an exceedingly thin, colorless, plastic, non-porous insulation coating, without impairment of curing efficiency, provided only that the total exposed surface of the fresh concrete be continuously and completely coated. And further, as between equal measures of film or coat-forming liquids, my liquid will effectively insulate an area of concrete surface five hundred to one thousand percent greater than any other liquid used in curing concrete today. The greater coverage results in a very substantially reduced cost to cure concrete by my method.

In carrying out the aforesaid process I have discovered that a desirable article to use is a compound composed of a saturated solution of naphtha and rosin, to which is added approximately ten percentum of pine oil by weight. In comparison with curing methods that contemplate the use of wet burlap or the like, my method eliminates the expense, labor and inconvenience of pumping or conveying water to the place where the method is used, and it produces much stronger concrete, due, of course, to the fact that the concrete mass is effectively protected from the atmosphere, and moisture in the concrete mass is effectively confined during the curing period. Curing methods that employ calcium chloride and sodium silicate require the use of wet burlap for about 24 hours before the curing agent can be applied. My method requires no wet burlap treatment, thus further reducing the cost of curing concrete. As between equal measures of film or coat-forming liquids, the material or composition used to form the protective film of my method will effectively insulate an area several times greater than any other and the greater coverage results in a further reduction in the cost of curing concrete structures.

Having thus described my invention, what I desire to secure by Letters Patent is:

1. A method of curing concrete, which consists in applying to freshly laid concrete a protective film or coating comprising a volatile liquid, a water-repellent substance, and a plasticizer.

2. A method of curing concrete, which consists in applying to freshly laid concrete a protective film or coating comprising a volatile mineral oil, a resinous substance, and a plasticizing agent.

3. A method of curing cement concrete, characterized by forming on the exposed surface of the wet unset concrete mass, as soon after tamping or finishing as might be practicable, a viscous, water-impervious, self-sealing, semi-fluid, protective coating of controlled volatility, formed from a volatile mineral oil solution of resinous substances in combination with a suitable plasticizer.

IRA S. REYNOLDS.